United States Patent [19]

Inaba et al.

[11] 4,352,620
[45] Oct. 5, 1982

[54] INDUSTRIAL ROBOT

[75] Inventors: Hajimu Inaba; Seiichiro Nakajima, both of Hino; Shigemi Inagaki, Musashino, all of Japan

[73] Assignee: Fujitsu Fanuc Limited, Tokyo, Japan

[21] Appl. No.: 162,878

[22] Filed: Jun. 25, 1980

[30] Foreign Application Priority Data

Jun. 30, 1979 [JP] Japan ................................. 54-082782

[51] Int. Cl.³ ............................................. B25J 3/00
[52] U.S. Cl. ................................... 414/225; 414/732; 414/738; 414/751
[58] Field of Search ............... 414/738, 732, 751, 749, 414/222, 225, 744; 29/568

[56] References Cited

U.S. PATENT DOCUMENTS

| | | | |
|---|---|---|---|
| 3,451,224 | 6/1969 | Colechia et al. | 414/738 |
| 3,850,313 | 11/1974 | Rackman | 414/751 |
| 3,884,365 | 5/1975 | Thomson | 414/738 |
| 3,922,930 | 12/1975 | Fletcher | 414/738 |
| 3,954,188 | 5/1976 | Boyle | 414/732 |
| 4,042,122 | 8/1977 | Espy | 414/751 |
| 4,062,455 | 12/1977 | Flatau | 414/738 |
| 4,177,002 | 12/1979 | Motoda | 414/751 |
| 4,283,165 | 8/1981 | Vertut | 414/738 |

Primary Examiner—Allen N. Knowles
Attorney, Agent, or Firm—Staas & Halsey

[57] ABSTRACT

An industrial robot having two rotative mechanisms that are adapted to rotate two arms relative to the axial directions thereof and which are interconnected such that their longitudinal axes intersect at right angles. An arm which belongs to the first rotative mechanism is secured to the base of the robot, and a gripping member is attached to the end of a free arm which belongs to the second rotative mechanism. This permits the gripping member to be moved in a plane which is parallel to the X-Z plane, and then in a plane which is parallel to the Y-Z plane, so that a workpiece or tool replacement can be moved along the perpendicular side walls of a machine tool frame. The degrees of freedom can be increased by providing the robot arms with additional mechanisms, particularly between the second rotative mechanism and the gripping member, such as a rotative mechanism for rotating the gripping member about the arm, an extendible shaft for extending the arm, or a linear drive mechanism for moving the gripping member at right angles to the longitudinal axis of the arm. Servo mechanisms may constitute the means for driving the rotative mechanisms, the exendible shaft and the linear drive mechanism.

22 Claims, 8 Drawing Figures

INDUSTRIAL ROBOT

BACKGROUND OF THE INVENTION

This invention relates to an industrial robot, and more particularly to an industrial robot capable of operating effectively even in a very limited amount of floor space.

Industrial robots are often employed in machine tool operations and are adapted to exchange tools and workpieces so that the machining operation can proceed in a fully automatic manner. Industrial robots employed in such automated operation must meet a number of important requirements: they should permit a task to be performed quickly; they should be installable even where space is limited; and they should process freedom of movement along a straight line as required to mount and dismount a workpiece.

Hitherto disclosed industrial robots used for automatic machine tool operation have been designed on the basis of cylindrical and polar coordinate systems or the like. In these industrial robots an elongated, rodlike arm having a manipulator attached at one end is rotated about a fixed position which serves as the center of rotation, and the arm is extended or retracted to vary the distance between the manipulator and the center of rotation. Such an arrangement results in a large distance between the handling portion of a workpiece mounted in a machine tool, such as the position of a chuck in a lathe, and the center of rotation of the robot. In addition, the arm projects rearwardly of the center of rotation to a great extent. For these reasons the installed robot must be provided with a large surrounding floor space so that the robot will not interfere with adjacent equipment when going through its various motions. Much of this space is dead space. Moreover, since the arm is merely a single rod or shaft, a wide variety of manipulative operations is obviously impossible, and freedom of movement along a straight line for mounting and dismounting the workpiece is lost. Thus it has not been possible to fully meet the requirements of an industrial robot as set forth above.

BRIEF SUMMARY OF THE INVENTION

Accordingly, it is an object of the present invention to provide an industrial robot which can be installed in close proximity to a machine tool and which is capable of minimizing working time.

It is another object of the present invention to provide an industrial robot which requires very little floor space for installation.

It is still another object of the present invention to provide an industrial robot which is capable of performing all necessary operations, even with a limited degree of freedom, by providing perpendicularly intersecting rotative mechanisms and making effective utilization of linear motion.

It is a further object of the present invention to provide an industrial robot which employs a servo mechanism in a drive mechanism for driving finger and arm mechanisms.

In accordance with one aspect of the present invention, an industrial robot is provided with first and second rotative mechanisms adapted to support an arm. The second rotative mechanism which cooperates in supporting the arm intersects the arm at right angles. The first rotative mechanism is perpendicularly disposed with respect to the second rotative mechanism and supports the second rotative mechanism such that the attitude thereof can be changed. In accordance with another aspect of the present invention, the industrial robot includes an industrial robot which comprises; a first rotative mechanism having a first arm and a second arm provided at each end thereof, the first arm fixedly secured of a base, a second rotative mechanism coupled at one end to the second arm of the first rotative mechanism and having an arm secured to the other end thereof, the second rotative mechanism being arranged such that the longitudinal axis thereof crosses the longitudinal axis of the first rotative mechanism at right angles; and a finger mechanism mounted on the arm of the second rotative mechanism.

Other features and advantages of the invention will be apparent from the following description taken in connection with the accompanying drawings.

DETAILED DESCRIPTION OF THE PREFERRED EMBODIMENT

Figure 1:
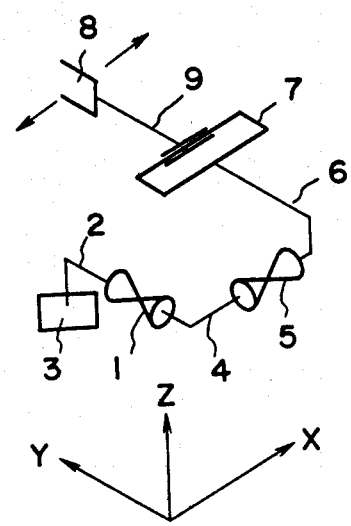
FIGS. 1 through 3 are schematic perspective views useful in describing both the structure and an operational sequence of an arm mechanism of a robot in accordance with the present invention.
Figure 2:
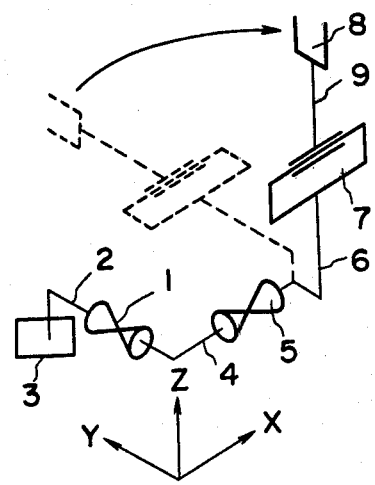
Figure 3:
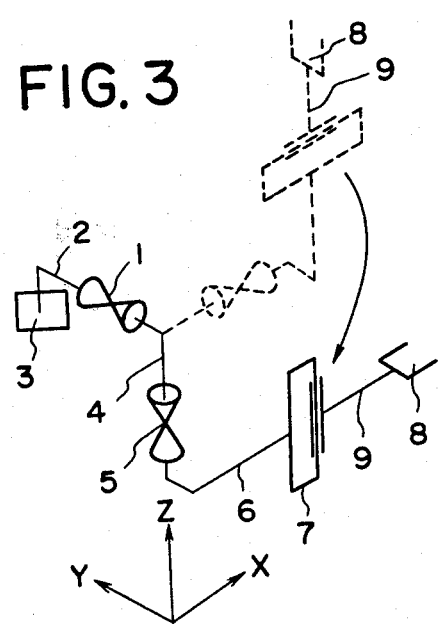

The basic structure of the arm mechanism belonging to the robot of the present invention is shown in FIGS. 1 through 3, wherein FIG. 1 shows the arm mechanism at the beginning of an operational sequence, FIG. 2 during the course of the operational sequence, and FIG. 3 at the end of the operational sequence.

A first rotative mechanism 1 is interposed between a pair of arms 2, 4 and is adapted to rotate the arm 4 relative to the arm 2 about the longitudinal axis of the first rotative mechanism 1. The latter is secured at one end to a base 3 through the arm 2, which has a 90° bend, and is connected at the other end to the arm 4 which also has a 90° bend. A second rotative mechanism 5, which has the same construction as the first rotative mechanism 1, is coupled at one end to the arm 4, and is connected at the other end to an arm 6. The arm 6 is configured to extend slightly from the second rotative mechanism 5 in the direction of the positive X-axis, then a short distance in the direction of the positive Z-axis, and finally over a major portion of its length in the direction of the positive Y-axis, this end of the arm being coupled to a transversely movable member 7. An arm 9 connects the transversely movable member 7 with a finger mechanism 8. It will be appreciated from FIG. 1 that the longitudinal axes of the respective rotative mechanisms are arranged so as to cross each other at right angles.

The robot arm mechanism described above is capable of being operated in the following manner. First, the transversely movable member 7 is actuated to move the finger mechanism 8 in the direction of the X-axis from the position it is shown occupying in FIG. 1, with the arm 6 being held stationary. This causes the finger mechanism 8 to abut against and grip a machined workpiece held by, for example, a chuck in a machine tool. The member 7 is then reactuated to move the finger mechanism 8 back to the position it originally occupied in FIG. 1, whereby the finger mechanism extracts the workpiece from the chuck and continues to grip it firmly. Next, the second rotative mechanism 5 is driven to rotate the arm 9 by 90° in a plane parallel to the Y-Z plane, thereby placing the arm 9 in a vertical attitude, as shown in FIG. 2. The first rotative mechanism 1 is then rotated to turn the arm 9 in a plane parallel to the X-Z plane, as illustrated in FIG. 3, so that the finger mechanism 8 is shifted and then stopped at a prescribed position above a workpiece feeder, by way of example. This is followed by actuation of the transversely movable member 7 so as to lower the finger mechanism 8, after which the finger mechanism is caused to loosen its grip and release the finished workpiece, thereby setting the workpiece on the feeder.

The three degrees of freedom provided by the first rotative mechanism, the second rotative mechanism and the transversely movable member allow the finger mechanism 8 to be moved along two perpendicular side walls of a machine tool frame, and also permit the workpiece, after having been removed from the chuck, to be rotated by 90° and placed on the workpiece feeder without relying upon the twisting action of a wrist portion.

Figure 4:
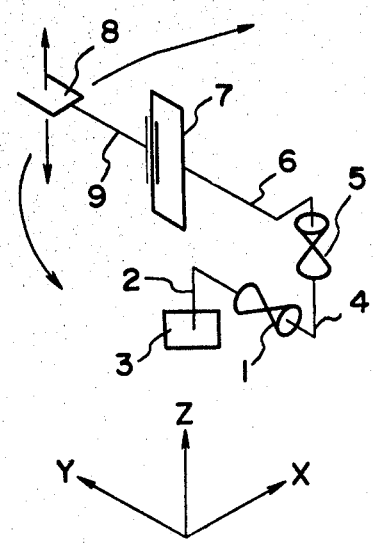
FIG. 4 is a schematic perspective view showing a different attitude of the arm mechanism of the robot.

The robot arm mechanism can also be operated by rotating the first rotative mechanism 1 prior to the second rotative mechanism 5 to align the longitudinal axis of the second rotative mechanism 5 with the Z-axis as shown in FIG. 4, after which the second rotative mechanism 5 may be rotated to swing the finger mechanism 8 in a horizontal plane, that is, in a plane which is parallel to the X-Y plane. Thus, if the second rotative mechanism 5 is rotated starting from the attitude shown in FIG. 4, the finger mechanism 8 can be moved along the surface of the workpiece feeder. If an unmachined workpiece is resting upon the workpiece feeder and is to be carried to the chuck, the transversely movable member 7 can be actuated to raise the finger mechanism 8, after which the second rotative mechanism 5 is rotated to swing the finger mechanism 8 to a position above the unmachined workpiece. The transversely movable member 7 is then reactuated so as to lower the finger mechanism 8 and permit it to grasp the unmachined workpiece. The latter is then fitted into the chuck by commanding the robot to reverse the foregoing sequence.

Figure 5:
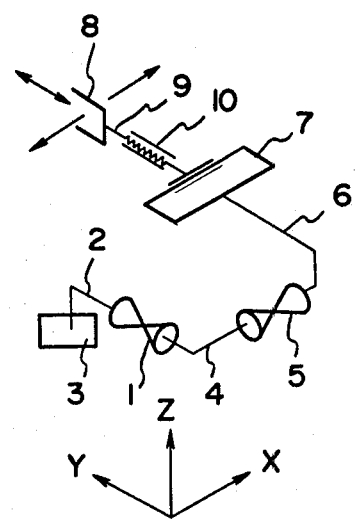
FIGS. 5 and 6 are schematic perspective views useful in describing the structure and operation of another embodiment of the present invention.
Figure 6:
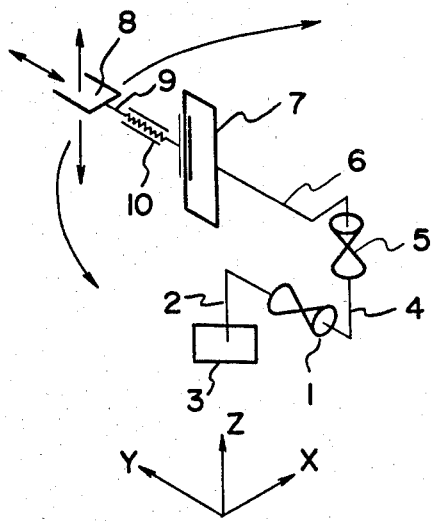

While the fundamental structure and operation of the robot arm mechanism in accordance with the present invention is as described above, a degree of freedom can be added by providing the arm mechanism with an extendable shaft. This will enable a greater variety of robot movements. Such a structure is shown in FIGS. 5 and 6 which illustrate a second embodiment of the present invention. Here an extendable shaft 10 is provided between the arm 9 and the transversely movable member 7 to enable the finger mechanism 8 to be moved longitudinally of the arm 9.

It should be noted that the variety of robot movements can be increased even further by providing the arms 2, 4 and 6 with their own extendable shafts, although such a modification is not shown in the drawings. It is also possible to provide a wrist mechanism on the end of the arm 9 to permit the twisting of the finger mechanism 8, and to provide a rotative mechanism that can swing the finger mechanism 8 around the longitudinal axis of the arm 9. However, such wrist and rotative mechanisms are diverse in construction and well known in the art and need not be described in further detail.

Figure 7:
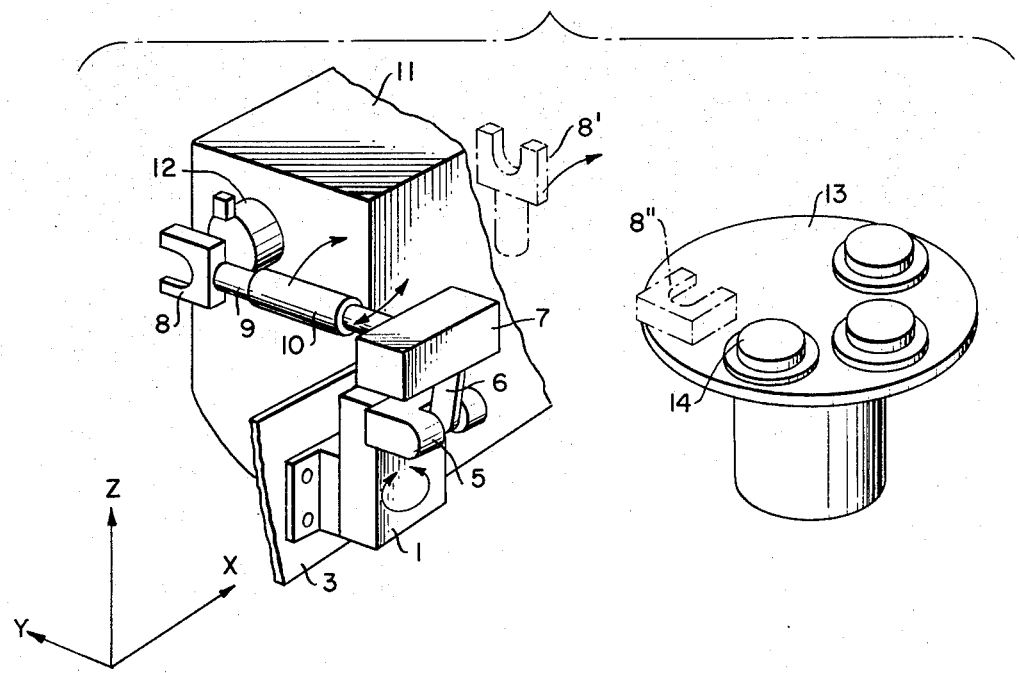
FIG. 7 is a perspective view showing the external appearance of the robot.

The external configuration of a robot for accomplishing the second embodiment of the invention is shown in the perspective view of FIG. 7, in which reference numeral 11 denotes a machine tool, 12 a chuck provided on the machine tool, 13 a workpiece feeder, and 14 a workpiece. Like or corresponding component parts bear the same reference numerals as those used in FIGS. 1 through 6.

The robot shown in FIG. 7 operates as follows. First, the transversely movable member 7 is actuated to bring the finger mechanism 8 to the vicinity of the chuck 12 so that the finger mechanism can grasp a machined workpiece which is being held by the chuck. Following this the transversely movable member 7 is driven in the opposite direction to remove the workpiece from the chuck. Next the second rotative mechanism 5 is actuated to swing the finger mechanism 8 in a plane which is parallel to the X-Z plane and move the finger mechanism to the position designated by numeral 8'. Thereafter the first rotative mechanism 1 is actuated to swing the finger mechanism 8 in a plane which is parallel to the X-Z plane and move the finger member to the position designated by numeral 8'', and the extendable shaft 10 is actuated to extend the arm 9. This operation positions the finger mechanism 8, which is still grasping the workpiece, over the workpiece feeder 13, so that the workpiece 14 can be set on the feeder by causing the finger mechanism 8 to release its grasp. Mounting an unmachined workpiece in the chuck of the machine tool can be carried out by the robot hand mechanism merely by reversing the foregoing sequence.

Figure 8:
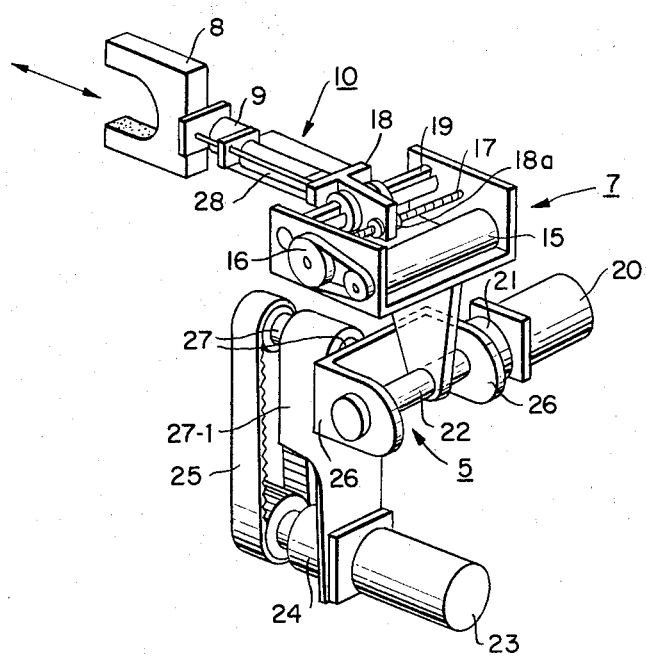
FIG. 8 is a perspective view showing the interior of the arm mechanism of the robot.

The internal structure of the robot arm mechanism is shown in the perspective view of FIG. 8. The transversely movable member 7 includes a motor 15, a timing belt 16, a ball bearing feed screw 17, a bracket 18 and a ball bearing spline 19. The motor 15 is adapted to rotate the feed screw 17 through the timing belt 16. The bracket 18 for supporting the finger mechanism 8 is mounted on the ball bearing spline 19 and is fixed against rotational movement thereby. Fixedly secured to the bracket 18 is a nut 18a which is screwed onto the feed screw 17. To move the bracket 18 the motor 15 is driven to rotate the feed screw 17 via the timing belt 16. The nut 18a travels along the screw 17 as the latter rotates and causes the bracket 18 to slide along the ball bearing spline 19.

The second rotative mechanism 5 includes a motor 20, a reduction gear 21, and a shaft 22 coupled to the reduction gear 21. Running the motor 20 rotatably drives the shaft 22 through the reduction gear 21 to swing the transversely movable member 7 which is connected to the shaft 22 through the arm 6.

The first rotative mechanism 1 is composed of a motor 23, a reduction gear 24, a timing belt 25, a bracket 26 for axially supporting the second rotative mechanism 5 and a rotary shaft 27 which is coupled to the bracket 26. The motor 23 is fixedly secured to a base 27-1, and the rotary shaft 27 is rotatively mounted to the base 27-1. Running the motor 23 drives the rotary shaft 27 through the reduction gear 24 and timing belt 25 to rotate the bracket 26.

The extendable shaft 10 includes an air cylinder 28 which is secured to the bracket 18 and which accommodates a piston having a rod that is splined on the arm 9.

The finger mechanism 8 is moved in the direction of the arrow as the piston slides within the air cylinder 28.

While the robot embodied by the arrangement of FIG. 8 employs motors to drive the respective arms, it is also possible to substitute other actuators for the motors, such as air cylinders, hydraulic motors or hydraulic cylinders.

In the foregoing embodiments the source of driving power for either the first or the second rotative mechanism may consist of a servo mechanism which relies upon electricity, oil pressure, air pressure or the like, enabling the robot to be operated under feedback control. Furthermore, such a servo mechanism can be used to construct the driving source for either the transversely movable member 7 or the extendible shaft or for both of these in addition to the rotative mechanisms. In other words, if desired, servo mechanisms can be adopted for all of the above, namely the first and second rotative mechanisms, the transversely movable member and the extendable shaft, or can be applied selectively as required. The particular combination will depend upon the design requirements.

In accordance with the present invention as described above, the arm mechanism of a robot can be moved along the two perpendicular side walls of a machine tool frame so that the space required for the robot to operate can be reduced markedly over the conventional robots that are based on polar or cylindrical coordinate systems. With the invention, operation of the arm mechanism is quicker since smaller angles are covered by the arms. In addition, since the attitude of a workpiece is shifted by 90° at the same time that the workpiece is moved along the perpendicular side walls of the machine tool frame, it is no longer required that a wrist be twisted to align a horizontally disposed surface of the workpiece with the vertically disposed surface of the chuck prior to mounting of the workpiece. It is possible, therefore, to dispense with the wrist mechanism and an associated control system so that the overall cost of the robot can be reduced. Furthermore, the hand can be furnished with an additional degree of freedom by providing the transversely movable member on the shaft connected to the finger mechanism, thereby facilitating such delicate operations as attaching and detaching a workpiece to and from the chuck. Still another degree of freedom is obtained by providing an arm with an extendable shaft to further enhance operation of the arm mechanism.

As many apparently widely different embodiments of the present invention can be made without departing from the spirit and scope thereof, it is to be understood that the invention is not limited to the specific embodiment thereof except as defined in the appended claims.

What we claim is:

1. An industrial robot which comprises:
   a first rotation drive mechanism;
   an arm rotatably supported by said first rotation drive mechanism; and
   a second rotation drive mechanism supported by said arm so that the attitude of said second rotation drive mechanism is changed by rotation of said first rotation drive mechanism, the axis of rotation of said second rotation drive mechanism being disposed substantially perpendicular to the axis of rotation of said first rotation drive mechanism.

2. An industrial robot according to claim 1, wherein both of the first and second rotation drive mechanisms comprise a servo mechanism.

3. An industrial robot according to claim 1, further comprising a finger mechanism operationally connected to said second rotation drive mechanism.

4. An industrial robot according to claim 3, further comprising transverse movement drive means operatively connected to said second rotation drive mechanism for moving said finger mechanism in a direction substantially parallel to the axis of rotation of said second rotation drive mechanism.

5. An industrial robot according to claim 1, further comprising a second arm rotatably supported by said second rotation drive mechanism.

6. An industrial robot according to claim 5, further comprising a finger mechanism operationally connected to said second arm.

7. An industrial robot according to claim 6, further comprising transverse movement drive means mounted on said second arm for moving said finger mechanism in a direction substantially parallel to the axis of rotation of said second rotative mechanism.

8. An industrial robot according to claim 7, wherein said transverse movement drive means comprises a servo mechanism.

9. An industrial robot according to any of claims 1, 2, 3, 4, 5, 6, 7 or 8, further comprising extendable shaft drive means for varying the length of any of said arms.

10. An industrial robot according to claim 9, wherein said extendable shaft drive means comprises a servo mechanism.

11. An industrial robot which comprises:
    a first rotative mechanism having a first arm and a second arm provided at each end thereof, said first arm being fixedly secured to a base;
    a second rotative mechanism having one end coupled to said second arm of said first rotative mechanism and having a third arm secured to the other end thereof, the axis of rotation of said first rotative mechanism being disposed substantially perpendicularly to the axis of rotation of said first rotative mechanism; and
    a finger mechanism operationally connected to said third arm.

12. An industrial robot according to claim 11, wherein at least one of the first and second rotative mechanisms comprises a servo mechanism.

13. An industrial robot according to claim 12, further comprising a third rotative mechanism secured to said third arm, said finger mechanism being operationally connected to said third rotative mechanism.

14. An industrial robot according to claim 11, further comprising transversely movable member means mounted on said third arm for moving said finger mechanism in a direction substantially parallel to the axis of rotation of said second rotative mechanism.

15. An industrial robot according to claim 14, wherein said transversely movable member means comprises a servo mechanism.

16. An industrial robot according to claims 11, 12, 13, 14 or 15, further comprising extendable shaft means for varying the length of any of said arms.

17. An industrial robot according to claim 16, wherein said extendable shaft means comprises a servo mechanism.

18. An industrial robot, comprising:
    a base;
    a first shaft supported by said base;
    means for rotating said first shaft;
    a second shaft;

means mounted on said first shaft for mounting said second shaft at substantially right angles to said first shaft;
means for rotating said second shaft;
an arm radially extending from said second shaft;
a finger mechanism; and
means operationally connecting said finger mechanism and said arm for moving said finger mechanism along a line substantially parallel to said second shaft, said means operationally connecting said finger mechanism and said arm comprising a housing mounted on the end of said arm, a feed screw rotatably mounted in said housing substantially parallel to said second shaft, means for rotating said feed screw, and a bracket mounted for movement along a line substantially parallel to said second shaft, said bracket being operationally connected to said feed screw and said finger mechanism.

19. The industrial robot of claim 18, wherein said means operationally connecting said finger mechanism and said arm additionally comprises means for moving said finger mechanism along a line substantially perpendicular to said second shaft.

20. The industrial robot of claim 19, wherein said means operationally connecting said finger mechanism and said arm comprises a housing mounted on the end of said arm, a feed screw rotatably mounted in said housing substantially parallel to said second shaft, means for rotating said feed screw, a bracket mounted for movement along a line substantially parallel to said second shaft, said bracket being operationally connected to said feed screw, and an extensible shaft having one end mounted on said bracket and the other end connected to said finger mechanism.

21. The industrial robot of claim 18, 19, or 20, wherein said means mounted on said first shaft for mounting said second shaft at substantially right angles to said first shaft comprises a U-shaped bracket having a base segment and an arm segment at either end of the base segment, said base segment of said U-shaped bracket being mounted on said first shaft and said second shaft being rotatably mounted on said arm segments.

22. The industrial robot of claim 21, wherein said means for rotating said first shaft comprises a motor mounted on said base and said means for rotating said second shaft comprises a motor mounted on said U-shaped bracket.

* * * * *

UNITED STATES PATENT AND TRADEMARK OFFICE
CERTIFICATE OF CORRECTION

PATENT NO. : 4,352,620

DATED : October 5, 1982

INVENTOR(S) : Inaba et al.

It is certified that error appears in the above-identified patent and that said Letters Patent is hereby corrected as shown below:

Col. 1, line 27, "portion" should be --position--.

Signed and Sealed this

Twenty-second Day of February 1983

[SEAL]

Attest:

GERALD J. MOSSINGHOFF

Attesting Officer     Commissioner of Patents and Trademarks